(12) United States Patent
Abdirashid et al.

(10) Patent No.: US 10,038,551 B2
(45) Date of Patent: Jul. 31, 2018

(54) SECURING ENTERPRISE DATA ON MOBILE DEVICES

(71) Applicant: INTERNATIONAL BUSINESS MACHINES CORPORATION, Armonk, NY (US)

(72) Inventors: Mohammad Abdirashid, Highland, NY (US); Frank J. Degilio, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 262 days.

(21) Appl. No.: 14/953,351

(22) Filed: Nov. 29, 2015

(65) Prior Publication Data

US 2017/0155505 A1    Jun. 1, 2017

(51) Int. Cl.
*H04L 29/06* (2006.01)
*H04L 9/08* (2006.01)
*H04L 29/08* (2006.01)
*H04W 12/02* (2009.01)

(52) U.S. Cl.
CPC ........ *H04L 9/0816* (2013.01); *H04L 67/2842* (2013.01); *H04L 63/0272* (2013.01); *H04L 63/0428* (2013.01); *H04W 12/02* (2013.01)

(58) Field of Classification Search
CPC ............. H04L 63/0428; H04L 63/0272; H04L 9/0816; H04L 67/2842
See application file for complete search history.

(56) References Cited

U.S. PATENT DOCUMENTS

| 8,412,955 | B1* | 4/2013 | Gupta | G06F 21/335 713/189 |
| 8,422,686 | B2 | 4/2013 | Cachin et al. | |
| 8,433,895 | B1* | 4/2013 | Sobel | H04L 63/0442 380/282 |
| 8,542,828 | B2 | 9/2013 | Rudland et al. | |

(Continued)

OTHER PUBLICATIONS

List of IBM Patents or Patent Applications Treated As Related (Appendix P); Date Filed: Mar. 14, 2016; 2 pages.

(Continued)

*Primary Examiner* — Beemnet Dada
*Assistant Examiner* — Stephen Gundry
(74) *Attorney, Agent, or Firm* — Cantor Colburn LLP; William A. Kinnaman, Jr.

(57) ABSTRACT

Embodiments include method, systems and computer program products for securing enterprise data in a mobile computing environment. Aspects include receiving a request to access the enterprise data stored on the mobile computing device in an encrypted format and determining whether a decryption key is stored in a cache memory of the mobile computing device. Based on determining that the decryption key is not stored in a cache memory of the mobile computing device, aspects include transmitting a request to an enterprise network for the decryption key and receiving the decryption key and storing the decryption key in the cache memory. Aspects also include decrypting the enterprise data using the decryption key and deleting the decryption key from the cache memory based on a determination that the decryption key has not been accessed for a period of time greater than a threshold time.

13 Claims, 5 Drawing Sheets

Processing System – 100

(56) References Cited

U.S. PATENT DOCUMENTS

| | | | |
|---|---|---|---|
| 8,561,209 B2 | 10/2013 | Goel et al. | |
| 8,588,422 B2 | 11/2013 | Beachem et al. | |
| 9,098,687 B2* | 8/2015 | Hayton | G06F 21/31 |
| 9,411,966 B1* | 8/2016 | Smith | H04L 63/0272 |
| 9,628,448 B2* | 4/2017 | Hayton | G06F 21/31 |
| 9,665,576 B2* | 5/2017 | Kapoor | G06F 17/3007 |
| 9,680,805 B1* | 6/2017 | Rodgers | H04L 63/061 |
| 9,710,659 B2* | 7/2017 | Ackerly | G06F 21/602 |
| 9,742,747 B2* | 8/2017 | Manges | H04L 63/061 |
| 2007/0057048 A1* | 3/2007 | Plotkin | G06F 21/62 235/382 |
| 2008/0046714 A1* | 2/2008 | Suganthi | H04L 63/0428 713/150 |
| 2008/0209221 A1 | 8/2008 | Vennelakanti et al. | |
| 2010/0235575 A1* | 9/2010 | Yasaki | G06F 21/554 711/115 |
| 2010/0250939 A1* | 9/2010 | Adams | G06F 11/1458 713/171 |
| 2011/0264907 A1* | 10/2011 | Betz | H04L 63/0428 713/153 |
| 2011/0314270 A1* | 12/2011 | Lifliand | H04L 63/0428 713/151 |
| 2012/0036370 A1* | 2/2012 | Lim | H04L 9/0822 713/189 |
| 2012/0110345 A1* | 5/2012 | Pigeon | H04L 63/0435 713/189 |
| 2012/0179918 A1 | 7/2012 | Haas et al. | |
| 2012/0297206 A1* | 11/2012 | Nord | G06F 21/602 713/193 |
| 2013/0067239 A1* | 3/2013 | Gupta | G06F 21/335 713/189 |
| 2013/0091351 A1* | 4/2013 | Manges | H04L 9/14 713/153 |
| 2013/0227279 A1* | 8/2013 | Quinlan | H04L 63/0428 713/165 |
| 2014/0059341 A1* | 2/2014 | Edwards | G06F 21/6209 713/152 |
| 2014/0059642 A1 | 2/2014 | Deasy et al. | |
| 2014/0173705 A1 | 6/2014 | Manning | |
| 2014/0281490 A1* | 9/2014 | Prakash | H04L 63/062 713/155 |
| 2014/0235158 A1 | 11/2014 | Hook et al. | |
| 2015/0012741 A1 | 1/2015 | Lim | |
| 2015/0058629 A1* | 2/2015 | Yarvis | H04L 63/061 713/171 |
| 2015/0101012 A1 | 4/2015 | White et al. | |
| 2015/0180656 A1 | 6/2015 | Rich et al. | |
| 2015/0229638 A1* | 8/2015 | Loo | H04L 63/029 726/9 |
| 2015/0278245 A1* | 10/2015 | Sagar | G06F 17/30174 707/610 |
| 2015/0295941 A1* | 10/2015 | Lim | H04L 9/0822 713/165 |
| 2015/0319144 A1* | 11/2015 | Barton | H04L 63/0428 713/168 |
| 2016/0063258 A1* | 3/2016 | Ackerly | G06F 21/602 713/189 |
| 2016/0308841 A1* | 10/2016 | Singhvi | H04L 63/0281 |
| 2016/0321464 A1* | 11/2016 | Tamayo-Rios | G06F 21/44 |
| 2016/0323112 A1* | 11/2016 | Chung | H04L 63/083 |
| 2016/0335447 A1* | 11/2016 | Guo | G06F 21/6218 |
| 2017/0185801 A1* | 6/2017 | Dutta | G06F 21/6245 |
| 2017/0222988 A1* | 8/2017 | Prakash | H04L 63/0428 |
| 2017/0230437 A1* | 8/2017 | Kumar | H04L 65/4084 |

OTHER PUBLICATIONS

U.S. Appl. No. 14/953,350; filed Nov. 29, 2015; Entitled: "Securing Enterprise Data on Mobile Devices".

U.S. Appl. No. 15/065,909, filed Mar. 10, 2016; Entitled: "Securing Enterprise Data on Mobile Devices".

U.S. Appl. No. 15/065,910, filed Mar. 10, 2016; Entitled: "Securing Enterprise Data on Mobile Devices".

Bardis et al., "A New Approach of Secret Key Management Lifecycle for Military Applications;" WSEAS Transactions on Computers, Issue 12, vol. 7, Dec. 2008 pp. 2011-2021.

Bits et al.; "Enterprise Key Managment: A Publication of the BITS Security Working Group;" May 2008; 24 pages.

List of IBM Patents or Patent Applications Treated As Related—Date Filed: Feb. 29, 2015; 2 pages.

Saroj, et al.; "Threshold Cryptography Based Data Security in Cloud Computing;" IEEE Computer Society, 2015; pp. 202-207.

U.S. Appl. No. 14/953,350, filed Nov. 29, 2015; Entitled: "Securing Enterprise Data on Mobile Devices".

* cited by examiner

SECURING ENTERPRISE DATA ON MOBILE DEVICES

BACKGROUND

The present disclosure relates to data security, and more specifically, to methods, systems and computer program products for securing enterprise data on mobile devices.

With the advent of mobile computing, many businesses are struggling with securing data on mobile computing devices (smart phones, tablets, etc.) that employees use to access sensitive data in their enterprise network. In general, employees want to be able to use their own mobile computing devices at work and businesses would like to encourage the productivity enhancements that bring your own device can bring to the enterprise.

In addition, many businesses have developed applications, commonly referred to as apps, to create new ways to engage their workforce. One drawback of such applications is that they are commonly configured to store enterprise data on the mobile computing device. As a result, an enterprise's information can end up being stored on a mobile computing device that the enterprise does not own and therefor do not have control over. In many cases, people who use their own mobile computing devices often allow others to use the device outside of the work environment. As a result, enterprise data can be exposed by users of the mobile computing device who might not consider the ramifications of exposing enterprise data on external sites.

Enterprises need to know that when the mobile computing device is not being used for business, any enterprise data on the mobile computing device is secured. Currently, many enterprises use encryption/decryption tools that are installed on the mobile computing device to encrypt and decrypt enterprise data. However, because the encryption/decryption tools are disposed on the mobile computing device, there remains a risk of exposure of the enterprise data as a user can unintentionally decrypt data and make it available.

SUMMARY

In accordance with an embodiment, a method for securing enterprise data in a mobile computing environment is provided. The method includes receiving a request to access the enterprise data stored on the mobile computing device in an encrypted format and determining whether a decryption key is stored in a cache memory of the mobile computing device. Based on determining that the decryption key is not stored in a cache memory of the mobile computing device, the method also includes transmitting a request to an enterprise network for the decryption key and receiving the decryption key and storing the decryption key in the cache memory. The method further includes decrypting the enterprise data using the decryption key and deleting the decryption key from the cache memory based on a determination that the decryption key has not been accessed for a period of time greater than a threshold time.

In accordance with another embodiment, a mobile computing device for securely accessing enterprise data includes a processor in communication with one or more types of memory. The processor is configured to receive a request to access the enterprise data stored on the mobile computing device in an encrypted format and determine whether a decryption key is stored in a cache memory of the mobile computing device. Based on determining that the decryption key is not stored in a cache memory of the mobile computing device, the processor is configured to transmit a request to an enterprise network for the decryption key, receive the decryption key and store the decryption key in the cache memory. The processor is further configured to decrypt the enterprise data using the decryption key and delete the decryption key from the cache memory based on a determination that the decryption key has not been accessed for a period of time greater than a threshold time.

In accordance with a further embodiment, a computer program product for securing enterprise data in a mobile computing environment includes a non-transitory storage medium readable by a processing circuit and storing instructions for execution by the processing circuit for performing a method. The method receiving a request to access the enterprise data stored on the mobile computing device in an encrypted format and determining whether a decryption key is stored in a cache memory of the mobile computing device. Based on determining that the decryption key is not stored in a cache memory of the mobile computing device, the method also includes transmitting a request to an enterprise network for the decryption key and receiving the decryption key and storing the decryption key in the cache memory. The method further includes decrypting the enterprise data using the decryption key and deleting the decryption key from the cache memory based on a determination that the decryption key has not been accessed for a period of time greater than a threshold time.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for securing enterprise data in a mobile computing environment are provided. In exemplary embodiments, securing enterprise data in a mobile computing environment includes operating an encryption/decryption application on a mobile computing device and temporarily storing encryption/decryption keys in a cache memory of the mobile computing system. In exemplary embodiments, the encryption/decryption keys are temporarily stored in the cache memory of the mobile computing device and have an associated time-to-live threshold, which is a maximum period of inactivity that the keys can remain in cache memory of the mobile computing device before being automatically deleted. Once the encryption/decryption keys are deleted, the mobile computing device must obtain new encryption/decryption keys from the enterprise network, which is configured to store and manage the encryption/decryption keys. In exemplary embodiments, the encryption/decryption key can be deleted upon an inactivity period of the encryption/decryption key reaching the time-to-live threshold or upon an application that requested the encryption/decryption key being closed.

Figure 1:
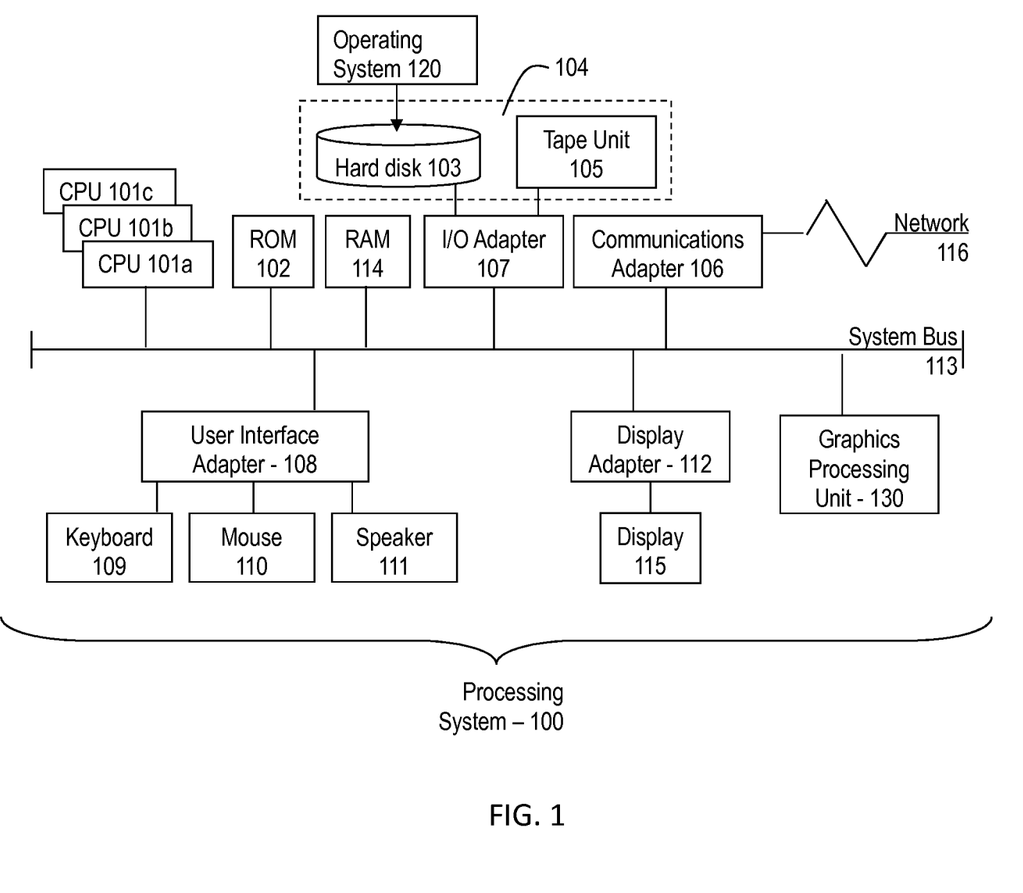
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
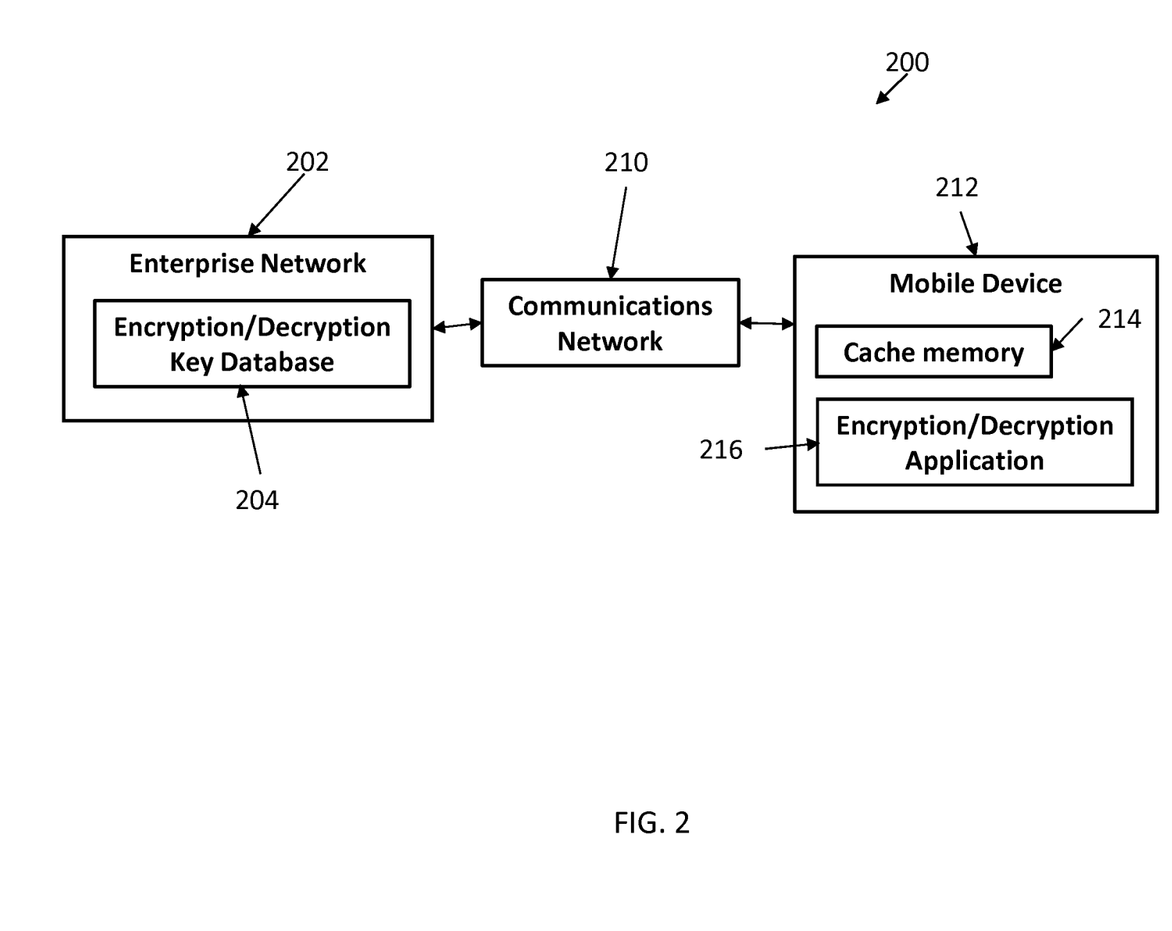
FIG. 2 is a block diagram illustrating a mobile computing environment in accordance with an exemplary embodiment.

Referring now to FIG. 2, a mobile computing environment 200 in accordance with an exemplary embodiment is illustrated. As illustrated, the mobile computing environment 200 includes an enterprise network 202 which includes an encryption/decryption key database 204. The mobile computing environment 200 also includes a communications network 210 and a mobile computing device 212. In exemplary embodiments, the mobile computing device 212 can be a smartphone, tablet or the like that are owned by an individual. The mobile computing device 212 includes an encryption/decryption application 216 and a cache memory 214 that is configured to store a key that is used by the encryption/decryption application 216. In addition, the mobile computing device 212 includes one or more applications that are configured to use enterprise data that is encrypted and decrypted by the encryption/decryption application 216.

In exemplary embodiments, the enterprise network 202 may include a processing system similar to the one described above with reference to FIG. 1. The enterprise network 202 includes an encryption/decryption key database 204 that is configured to store encryption/decryption keys that can be used by mobile computing device 212 to encrypt/decrypt enterprise data stored on the mobile computing device 212. The mobile computing device 212 is configured to communicate with the enterprise network 202 via the communications network 210.

In exemplary embodiments, the mobile computing device 212 is configured such that it can only store enterprise data in an encrypted format. In exemplary embodiments, when an application on the mobile computing device 212 receives a request to access encrypted enterprise data stored on the mobile computing device, the mobile computing device 212 determines if it has a locally stored decryption key in the cache memory 214. If the mobile computing device 212 determines that it does not have a decryption key, it must transmit a decryption key request to the enterprise network 202. Likewise, when a mobile computing device receives a request to store enterprise data that has been updated by mobile computing device, the mobile computing device 212 determines if it has a locally stored encryption key in the cache memory 214. If the mobile computing device 212 determines that it does not have an encryption key, it must transmit an encryption key request to the enterprise network 202.

In exemplary embodiments, the mobile computing device 212 is configured such that it can only store decryption keys in the cache memory 214 of the mobile computing device 212. By restricting the storage of decryption keys to the cache memory 214, as opposed to other types of available memory in the mobile computing device 212, such as a flash memory, a solid state storage device, or a RAM, the mobile computing device 212 can maintain control over what applications are able to access the decryption key.

Figure 3:
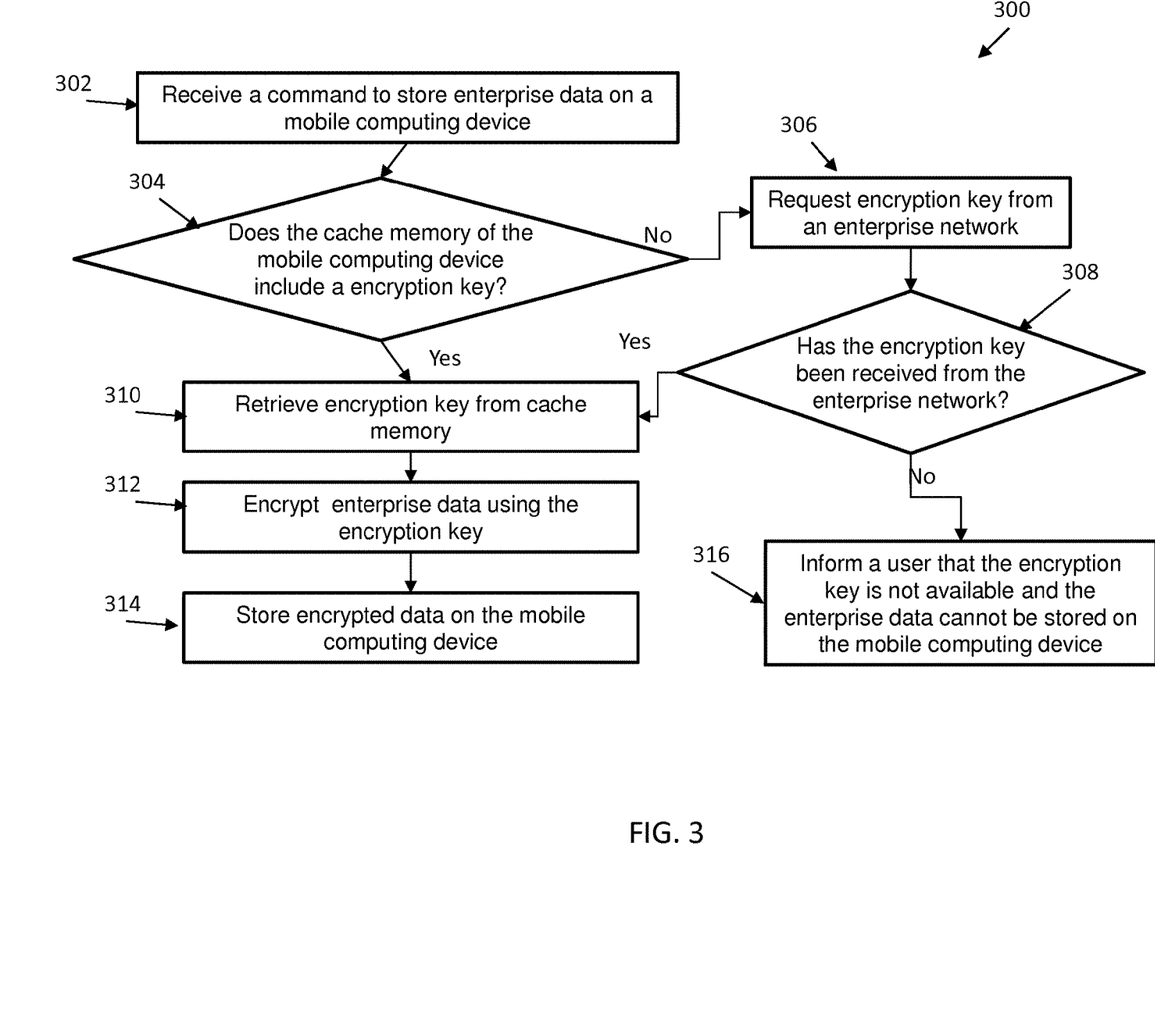
FIG. 3 is a flow diagram of a method for storing encrypted data by a mobile computing device in accordance with an exemplary embodiment.

Referring now to FIG. 3, a flow diagram of a method 300 for storing encrypted data by a mobile computing device in accordance with an exemplary embodiment is shown. As shown at block 302, the method 300 includes receiving a command to store enterprise data on a mobile computing device. Next, as shown at decision block 304, the method 300 includes determining whether an encryption key is stored in a cache memory of the mobile computing device. If the encryption key is stored in the cache memory of the mobile computing device, the method 300 proceeds to block 310. Otherwise, the method 300 proceeds to block 306 and requests encryption key from an enterprise network. As shown at decision block 308, the method includes determining if the mobile computing device has received an encryption key from the enterprise network. If the mobile computing device has received an encryption key from the enterprise network, the method 300 proceeds to block 310. Otherwise, the method 300 proceeds to block 316 and informs the user that the encryption key is not available and that the enterprise data cannot be stored on the mobile computing device.

Continuing with reference to FIG. 3, as shown at block 310, the method 300 includes retrieving the encryption key from cache memory. Next, as shown at block 312, the method 300 includes encrypting the enterprise data using the encryption key. Once the enterprise data has been encrypted, the method 300 includes storing the encrypted enterprise data on the mobile computing device, as shown at block 314.

Figure 4:
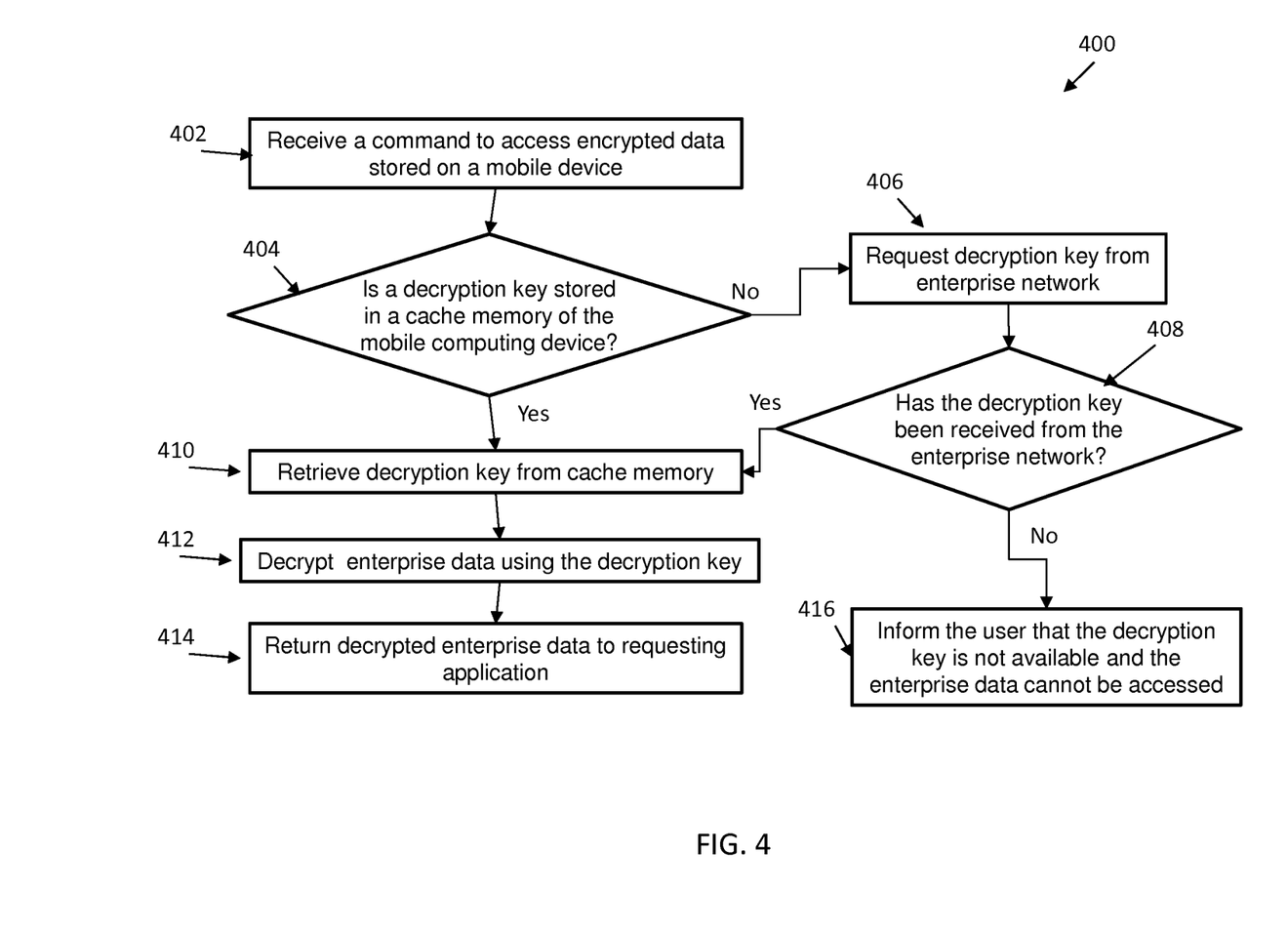
FIG. 4 is a flow diagram of a method for accessing encrypted data by a mobile computing device in accordance with an exemplary embodiment.

Referring now to FIG. 4, a flow diagram of a method 400 for accessing encrypted data by a mobile computing device in accordance with an exemplary embodiment is shown. As shown at block 402, the method 400 includes receiving a command to access encrypted data stored on a mobile computing device. As shown at decision block 404, the method 400 includes determining if a decryption key stored in a cache memory of the mobile computing device. If the decryption key is not stored in a cache memory of the mobile computing device, the method 400 proceeds to block 406 and requests the decryption key from enterprise network. Otherwise, the method 400 proceeds to block 410. As shown at decision block 408, the method 400 includes determining if the decryption key has been received from the enterprise network. If the decryption key has not been received from the enterprise network, the method 400 proceeds to block 416 and informs the user that the decryption key is not available and the enterprise data cannot be accessed.

Continuing with reference to FIG. 4, as shown at block 410, the method 400 includes retrieving the decryption key from cache memory. Next, as shown at block 412, the method 400 includes decrypting the enterprise data using the decryption key. Once the enterprise data has been decrypted, the method 400 includes providing the decrypted enterprise data to the requesting application, as shown at block 414.

Figure 5:
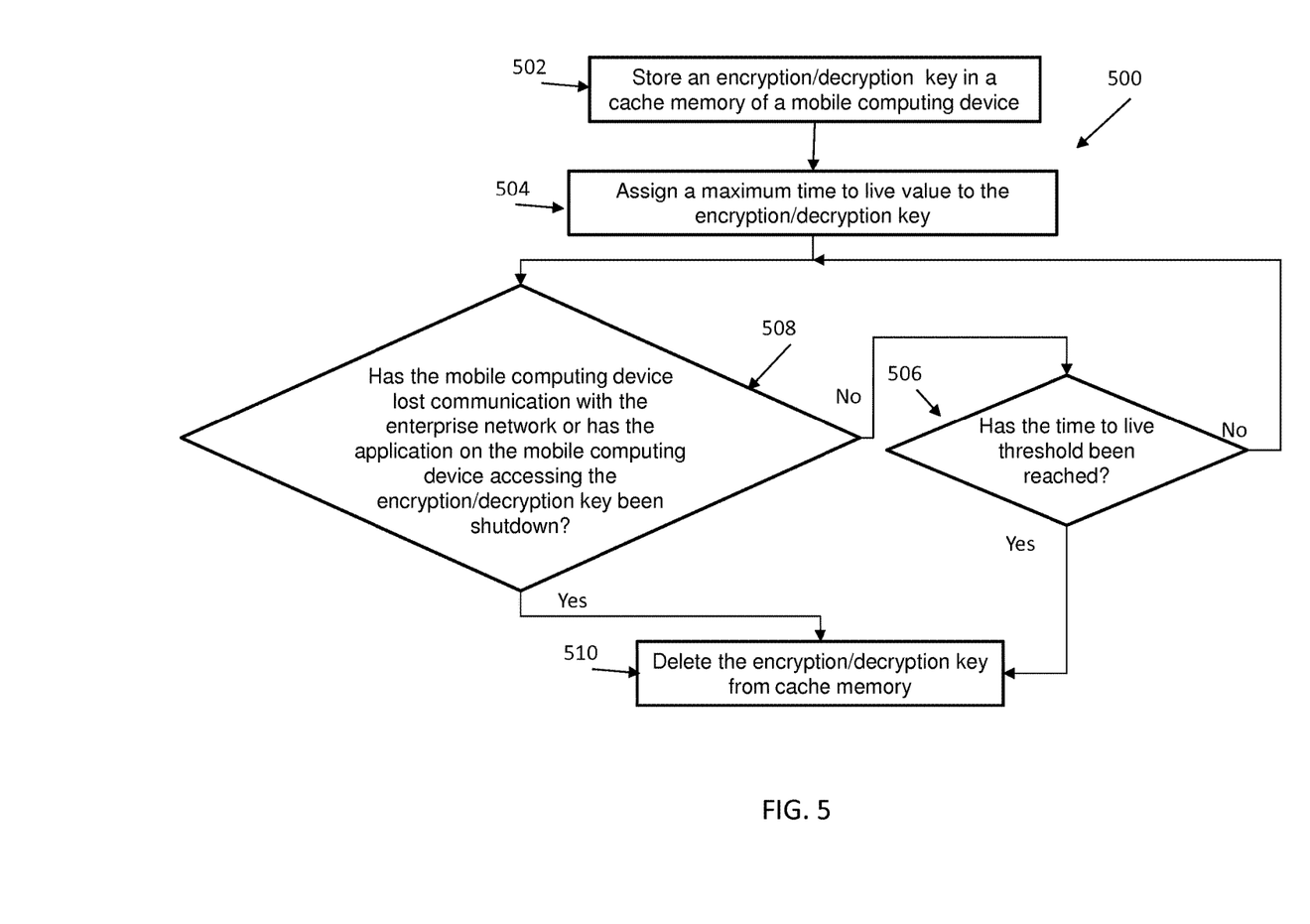
FIG. 5 is a flow diagram of a method for storing an encryption/decryption key by a mobile computing device in accordance with an exemplary embodiment.

Referring now to FIG. 5, a flow diagram of a method 500 storing an encryption/decryption key by a mobile computing device in accordance with an exemplary embodiment is shown. As shown at block 502, the method 500 includes storing an encryption/decryption key in a cache memory of a mobile computing device. Next, as shown at block 504, the method 500 includes assigning a maximum time to live value to the encryption/decryption key. The method 500 also includes determining if the time to live threshold for the encryption/decryption key been reached, as shown at decision block 506. If the time to live threshold for the encryption/decryption key has been reached, the method 500 includes deleting the encryption/decryption key from cache memory, as shown at block 510. In exemplary embodiments, the time to live threshold is a maximum allowable period of inactivity for the encryption/decryption key. The method 500 also includes determining if the mobile computing device has lost communication with the enterprise network or if the application on the mobile computing device accessing the encryption/decryption key has been shut down, as shown at decision block 508. If either of these conditions has occurred, the method 500 proceeds to block 510 and deletes the encryption/decryption key from cache memory. Otherwise, the method 500 continues to monitor whether time to live threshold for the encryption/decryption key been reached.

In exemplary embodiments, when an application on the mobile computing device encrypts or decrypts the enterprise data, the encryption/decryption key is obtained from the enterprise network and stored in a cache memory of the mobile computing device. This introduces security exposure as the encryption/decryption key resides in cache memory of the mobile computing device, and can be accessed by any user or application in the mobile computing device to decrypt the data and make it available, either intentionally and unintentionally. To protect from such exposure, a time to live threshold is assigned to the encryption/decryption key that is stored in the cache memory. In exemplary embodiments, the time to live threshold is a maximum amount of time that the encryption/decryption key can be stored in the cache memory of the mobile computing device without being accessed by the mobile computing device. In exemplary embodiments, a timer associated with the encryption/decryption key can be reset each time an application on the mobile computing device accesses the encryption/decryption key. Once the timer value exceeds the time to live threshold, the encryption/decryption key will be deleted from the cache memory. If the user attempts to encrypt or decrypt the enterprise data after the deletion of the encryption/decryption key from the cache, the mobile computing device will have to communicate with the enterprise network to obtain a new encryption/decryption key. In exemplary embodiments, the mobile computing device is configured such that the encryption/decryption key is never stored or persisted in any other memory of the mobile computing device than the cache memory. In exemplary embodiments, the encryption/decryption key can be deleted upon an inactivity period of the encryption/decryption key reaching the time-to-live threshold or upon an application that requested the encryption/decryption key being closed.

In exemplary embodiments, by storing the encryption/decryption applications on the mobile computing device, rather than on the enterprise network, the communications bandwidth needed to encrypt and decrypt enterprise data can be reduced. In exemplary embodiments, the communications data required for encrypting and decrypting files is minimized as the enterprise data to encrypt and decrypt never leaves the device, or travels through the communications network. Rather, the only communications bandwidth that is consumed is the transmission of the encryption/decryption keys.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for securing enterprise data in a mobile computing environment, the computer program product comprising:
a non-transitory storage medium readable by a processing circuit and storing instructions for execution by the processing circuit for performing a method comprising:
receiving a request to access an enterprise data stored on a mobile computing device in an encrypted format;
determining whether a decryption key is stored in a cache memory of the mobile computing device;
based on determining that the decryption key is not stored in a cache memory of the mobile computing device:
transmitting a request to an enterprise network for the decryption key; and
receiving the decryption key and storing the decryption key in the cache memory;
decrypting the enterprise data using the decryption key;
deleting the decryption key from the cache memory based on a determination that the decryption key has not been accessed for a period of time greater than a threshold time; and
deleting the decryption key from the cache memory based on a determination that the mobile computing device has lost communication with the enterprise network.

2. The computer program product of claim 1, wherein the mobile computing device is configured to only store the decryption key in the cache memory.

3. The computer program product of claim 1, the method further comprising denying the request to access the enterprise data based on a determination that the decryption key was not received from the enterprise network and that the decryption key is not stored in the cache memory.

4. The computer program product of claim 1, the method further comprising providing access to the enterprise data in a decrypted format to an application on the mobile computing device.

5. The computer program product of claim 4, the method further comprising:
   updating the enterprise data in the decrypted format by the application to create updated enterprise data;
   receiving a request to store the updated enterprise data in an encrypted format;
   determining whether an encryption key is stored in a cache memory of the mobile computing device;
   based on determining that the encryption key is not stored in a cache memory of the mobile computing device:
      transmitting a request to the enterprise network for the encryption key; and
      receiving the encryption key and storing the encryption key in the cache memory;
   encrypting the enterprise data using the encryption key; and
   deleting the encryption key from the cache memory based on a determination that the encryption key has not been accessed for the period of time greater than a threshold time.

6. The computer program product of claim 5, wherein the mobile computing device is configured to only store the encryption key in the cache memory.

7. The computer program product of claim 5, the method further comprising denying the request to store the updated enterprise data in the encrypted format based on a determination that the encryption key was not received from the enterprise network and that the encryption key is not stored in the cache memory.

8. A mobile computing device for securely accessing enterprise data, comprising:
   a processor in communication with one or more types of memory, the processor configured to:
   receive a request to access an enterprise data stored on the mobile computing device in an encrypted format;
   determine whether a decryption key is stored in a cache memory of the mobile computing device;
   based on determining that the decryption key is not stored in a cache memory of the mobile computing device:
      transmit a request to an enterprise network for the decryption key; and
      receive the decryption key and store the decryption key in the cache memory;
   decrypt the enterprise data using the decryption key;
   delete the decryption key from the cache memory based on a determination that the decryption key has not been accessed for a period of time greater than a threshold time; and
   delete the decryption key from the cache memory based on a determination that the mobile computing device has lost communication with the enterprise network.

9. The mobile computing device of claim 8, wherein the processor is further configured to deny the request to access the enterprise data based on a determination that the decryption key was not received from the enterprise network and that the decryption key is not stored in the cache memory.

10. The mobile computing device of claim 8 wherein the processor is further configured to provide access to the enterprise data in a decrypted format to an application on the mobile computing device.

11. The mobile computing device of claim 10, wherein the processor is further configured to:
    update the enterprise data in the decrypted format by the application to create updated enterprise data;
    receive a request to store the updated enterprise data in an encrypted format;
    determine whether an encryption key is stored in a cache memory of the mobile computing device;
    based on determining that the encryption key is not stored in a cache memory of the mobile computing device:
       transmit a request to the enterprise network for the encryption key; and
       receive the encryption key and store the encryption key in the cache memory;
    encrypt the enterprise data using the encryption key; and
    delete the encryption key from the cache memory based on a determination that the encryption key has not been accessed for the period of time greater than a threshold time.

12. The mobile computing device of claim 11, wherein the mobile computing device is configured to only store the encryption key and the decryption key in the cache memory.

13. The mobile computing device of claim 11, wherein the processor is further configured to deny the request to store the updated enterprise data in the encrypted format based on a determination that the encryption key was not received from the enterprise network and that the encryption key is not stored in the cache memory.

* * * * *

UNITED STATES PATENT AND TRADEMARK OFFICE
CERTIFICATE OF CORRECTION

PATENT NO. : 10,038,551 B2
APPLICATION NO. : 14/953351
DATED : July 31, 2018
INVENTOR(S) : Abdirashid et al.

It is certified that error appears in the above-identified patent and that said Letters Patent is hereby corrected as shown below:

On the Title Page

Item (72) Inventors should be corrected to read:
Mohammad Abdirashid, Highland, NY (US)
Frank J. De Gilio, Poughkeepsie, NY (US)

Signed and Sealed this
Thirtieth Day of April, 2019

Andrei Iancu
*Director of the United States Patent and Trademark Office*